United States Patent [19]

Tsurushima

[11] Patent Number: 5,467,332
[45] Date of Patent: Nov. 14, 1995

[54] DISC CLEANING DEVICE

[75] Inventor: Katsuaki Tsurushima, Kanagawa, Japan

[73] Assignee: Sony Corporation, Tokyo, Japan

[21] Appl. No.: 985,815

[22] Filed: Dec. 3, 1992

[30] Foreign Application Priority Data

Dec. 6, 1991 [JP] Japan .................. 3-348983

[51] Int. Cl.⁶ .................. G11B 3/58; G11B 5/41
[52] U.S. Cl. .................. 369/72; 360/128
[58] Field of Search .................. 369/72, 77.2; 360/128, 360/137; 15/97.1, 159 R, DIG. 14

[56] References Cited

U.S. PATENT DOCUMENTS

| | | | |
|---|---|---|---|
| 4,916,564 | 4/1990 | Fritsch | 360/137 |
| 5,025,436 | 6/1991 | Crain et al. | 369/77.2 |
| 5,124,975 | 6/1992 | Naoki et al. | 369/77.2 |

FOREIGN PATENT DOCUMENTS

| | | | |
|---|---|---|---|
| 61-57008 | 3/1986 | Japan | 369/72 |
| 63-244459 | 10/1988 | Japan | 369/72 |
| 63-251986 | 10/1988 | Japan | 369/72 |
| 2-254692 | 10/1990 | Japan | 369/72 |
| 3-93080 | 4/1991 | Japan | 369/72 |
| 3-142770 | 6/1991 | Japan | 369/72 |

*Primary Examiner*—Robert S. Tupper
*Assistant Examiner*—Allen Cao
*Attorney, Agent, or Firm*—Limbach & Limbach

[57] ABSTRACT

A disc cleaning device for cleaning a disc on which information signals are pre-recorded or are to be recorded and which is housed within a disc cartridge, is disclosed. The disc cleaning device includes a cartridge holder in which a disc cartridge is loaded. The disc cartridge is the disc accommodated in a cartridge main body. The disc cleaning device also includes a shutter opening unit for moving a shutter member for opening an aperture in the disc cartridge loaded on the cartridge holder, which aperture has been closed by the shutter member. The disc cleaning device also includes a disc rotating and driving unit for rotating the disc housed within the disc cartridge, and a cleaning unit having a cleaning member adapted for being caused to bear on an information recording surface of the disc via the aperture in the disc cartridge.

2 Claims, 6 Drawing Sheets

DISC CLEANING DEVICE

BACKGROUND OF THE INVENTION

This invention relates to a disc cleaning device for cleaning the information recording surface of a disc, such as an optical disc or a magneto-optical disc, housed within a cartridge main body. More particularly, it relates to a disc cleaning device for cleaning the information recording surface of the disc with a cleaning member by rotating the disc as it is housed within the cartridge main body.

Up to now, a disc such as an optical disc or a magneto-optical disc has been used as a disc-shaped recording medium for recording and/or reproducing information signals. This disc has a disc-shaped disc substrate, a center zone of which is adapted to be held by a disc rotating and driving unit of a disc player. The disc has at least one of its major surfaces as a signal recording surface for recording and/or reproducing information signals. A signal recording layer is deposited on the major surface of the disc substrate which is to be the signal recording surface.

In a disc player apparatus for optically reading and reproducing the information recorded on the optical disc or the magneto-optical disc, if dust and dirt are affixed to the signal recording surface of the disc, or the recording surface is grazed, the rate of occur fence of readout errors is increased to render it impossible to reproduce the information reliably. Thus a disc cartridge has been proposed in which the disc is accommodated in a cartridge main body in the form of a casing with a view to preventing the information recording surface from being damaged by contact with fingers or the like and assuring facilitated handling of the optical disc or the magneto-optical disc.

With such disc cartridge, the disc is housed for rotation within the cartridge main body. The cartridge main body has a chucking aperture for exposing a chucked part of the disc to outside and recording/reproducing apertures for exposing at least a portion of the signal recording surface of the disc to outside across the inner and outer peripheries of the disc. If this disc cartridge is loaded on the disc player apparatus, the chucked part of the disc housed in the cartridge main body is held via the chucking aperture, while recording and/or reproduction of the information signals on or from the signal recording surface is carried out via the recording and/or reproducing apertures.

With the above-described disc cartridge, a shutter member is used for closing the recording and/or reproducing apertures during non-use time for preventing dust and dirt from being intruded into the inside of the cartridge main body for protecting the disc. The shutter member includes shutter plate sections sized to close the recording and/or reproducing apertures. The shutter member has its web supported in the vicinity of a lateral surface of the cartridge main body so that the shutter member may be slid along the lateral side of the cartridge main body. By the sliding of the shutter member, the recording and/or reproducing apertures are opened and closed by the shutter plate sections.

Meanwhile, with the disc used in the unprotected state without being housed in the cartridge main body, the risk is high that impurities such as dust and dirt become affixed to the signal recording surface to injure the signal recording surface. However, such disc can be cleaned easily. On the contrary, it is possible with the disc cartridge having the disc housed within the cartridge main body to prevent such impurities from being intruded into the cartridge main body to protect the disc. However, with such disc problem is raised that, if impurities are intruded into the cartridge main body to become affixed to the signal recording surface of the disc, the signal recording surface cannot be cleaned easily.

OBJECT AND SUMMARY OF THE INVENTION

It is an object of the present invention to provide a disc cleaning device whereby the information recording surface of the disc, such as the optical disc or the magneto-optical disc, accommodated in the cartridge main body, may be cleaned easily.

The present invention provides a disc cleaning device for cleaning a disc on which information signals are pre-recorded or are to be recorded and Which is housed within a disc cartridge, comprising a cartridge holder in which a disc cartridge is loaded, said disc cartridge being said disc accommodated in a cartridge main body, shutter opening means for moving a shutter member for opening an aperture in said disc cartridge loaded on said cartridge holder, said aperture having been closed by said shutter member, rotating and driving means for rotating the disc housed within said disc cartridge, and cleaning means having a cleaning member adapted for being caused to bear on an information recording surface of said disc via said aperture in said disc cartridge.

With the present disc cleaning device, the apertures of the disc cartridge loaded on he cartridge holder are opened by the shutter opening unit and, while the disc accommodated in the cartridge main body is rotated by the disc rotating and driving unit, the information recording surface of the disc is cleaned by the cleaning device via the apertures in the disc cartridge.

other objects and advantages of the present invention will become apparent from the following description of preferred embodiment and appended claims.

DETAILED DESCRIPTION OF THE PREFERRED EMBODIMENT

The disc cleaning device according to the present invention is adapted for cleaning the information recording surface of a disc, such as an optical disc or a magneto-optical disc, accommodated in a cartridge main body.

Figure 1:
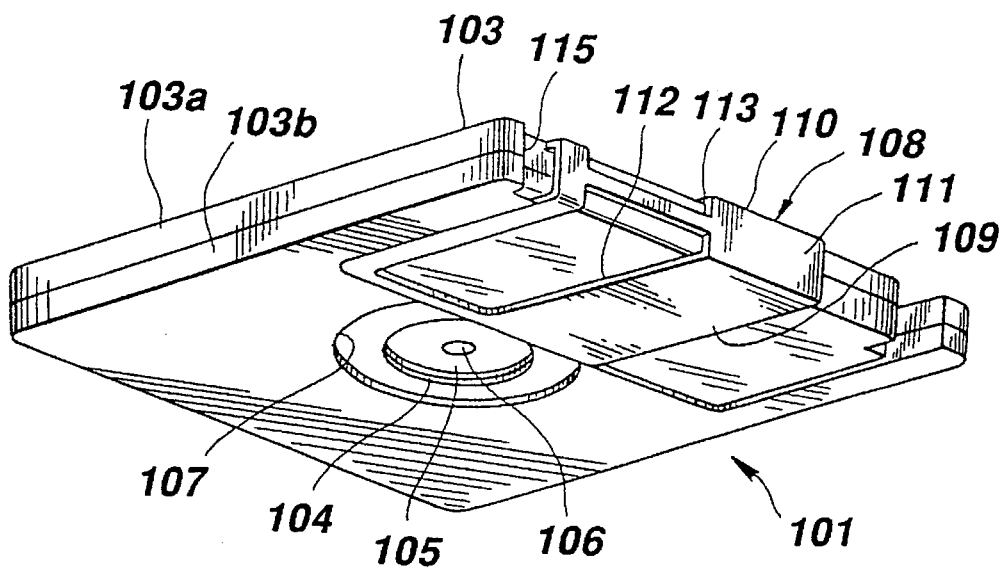
FIG. 1 is a perspective view, as viewed from the bottom side, showing the construction of a disc cartridge loaded on a disc cleaning device according to the present invention.
Figure 2:
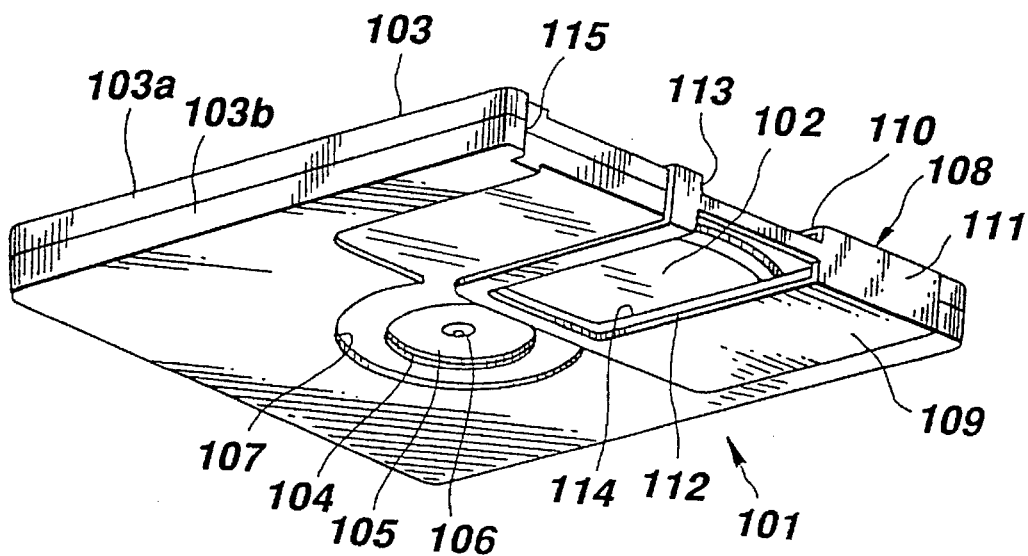
FIG. 2 is a perspective view, as viewed from the bottom side, showing the disc cartridge shown in FIG. 1, with the shutter member closed.

The disc cartridge comprises a magneto-optical disc 102, which is to be cleaned by the cleaning device of the present invention, and which is rotatably housed within a cartridge main body 103, as shown in FIGS. 1 and 2. The magneto-optical disc 102 comprises a disc substrate formed of transparent material, such as synthetic resin, and a signal recording layer deposited on one of the major surfaces of the disc substrate. A disc hub 105, by means of which the magneto-optical disc 102 is held on a disc table 13 of the disc cleaning device according to the present invention, is provided at a center zone of the magneto-optical disc 102. The disc hub 105 is formed substantially as a disk from a magnetic material, such as metal, and is fixed substantially coaxially, such as by adhesion and welding, to the magneto-optical disc 102. At the center of the disc hub 105, a center hole 106 is bored so that its center is coincident with he center of curvature of a recording track(s) formed spirally and substantially concentrically on the signal recording layer.

The cartridge main body 103 is formed by an upper half 103a and a lower half 103b which are abutted on and connected to each other to form a thin casing in which to hold the disc 102. The upper and lower major surfaces of the cartridge main body 103 are formed with a pair of recording/reproducing apertures 114 for exposing the major surfaces of the magneto-optical disc 102 to outside across the inner and outer peripheries of the disc. These recording/reproducing apertures 114 are substantially of the same size and shape and formed in facing relation to each other. The recording/reproducing aperture 114 formed in the upper major surface of the cartridge main body 103 exposes one of the major surfaces of the magneto-optical disc 102. The recording/reproducing aperture 114 formed in the lower major surface of the cartridge main body 103 exposes the other major surfaces of the magneto-optical disc 102.

A chucking aperture 104 for exposing the disc hub 105 outside is provided at a center zone of the lower major surface of the cartridge main body 103. A positioning recess 107 engaged by projections 12 of a cartridge positioning member 11 of the disc cleaning device according to the present invention is formed on the perimeter of the chucking aperture 104.

The cartridge main body 103 is fitted with a shutter member 108 which is formed from synthetic resin or metal by injection molding or bending in the form of a U-shaped member adapted for holding the upper and lower major surfaces of a lateral side of the cartridge main body 103. That is, the shutter member 108 is formed integrally from an upper shutter plate section 110 lying adjacent to the upper major surface of the cartridge main body, a lower shutter plate section 109 facing parallel to the upper plate section 110 and a web 111 interconnecting these plate sections. The shutter member 108 is supported by the cartridge main body 103 with the web 111 lying adjacent to and sliding in contact with the lateral side of the cartridge main body 103. The shutter plate sections 110, 109 are provided with a pair of window openings 112, 113 offset towards its one side along the sliding direction with respect to the cartridge main body 103.

When the shutter member 108 is disposed at the above-mentioned side with respect to the cartridge main body 103, as shown in FIG. 1, the other sides of the shutter plate sections are in register with the recording/reproducing apertures 114 for closing these apertures 114. When the shutter member 108 is disposed at the opposite side with respect to the cartridge main body 103, as shown in FIG. 2, the apertures 112, 113 are in register with the recording/reproducing apertures 114 for closing these apertures 114. Meanwhile, the shutter member 108 is biased by a spring, not shown, provided within the cartridge main body 103, in a direction of closing the recording/reproducing apertures 114.

The window openings 112, 113 are extended to a part of both sides of the web 111. That is, the portions of the web 111 in register with the window openings 112, 113 of the web 111 are reduced in width as compared to other portions so that the web 111 has a width in those portions smaller than the thickness of the cartridge main body 103. On the other hand, the portions of the cartridge main body 103 facing a lateral edge of the magneto-optical disc and in register with the recording/reproducing apertures 114, that is a forward edge 116 of the cartridge main body 103 facing outward via the window openings 112, 113 on opening the recording/reproducing apertures 114, are of a width smaller than the thickness of the magneto-optical disc 102.

Figure 3:
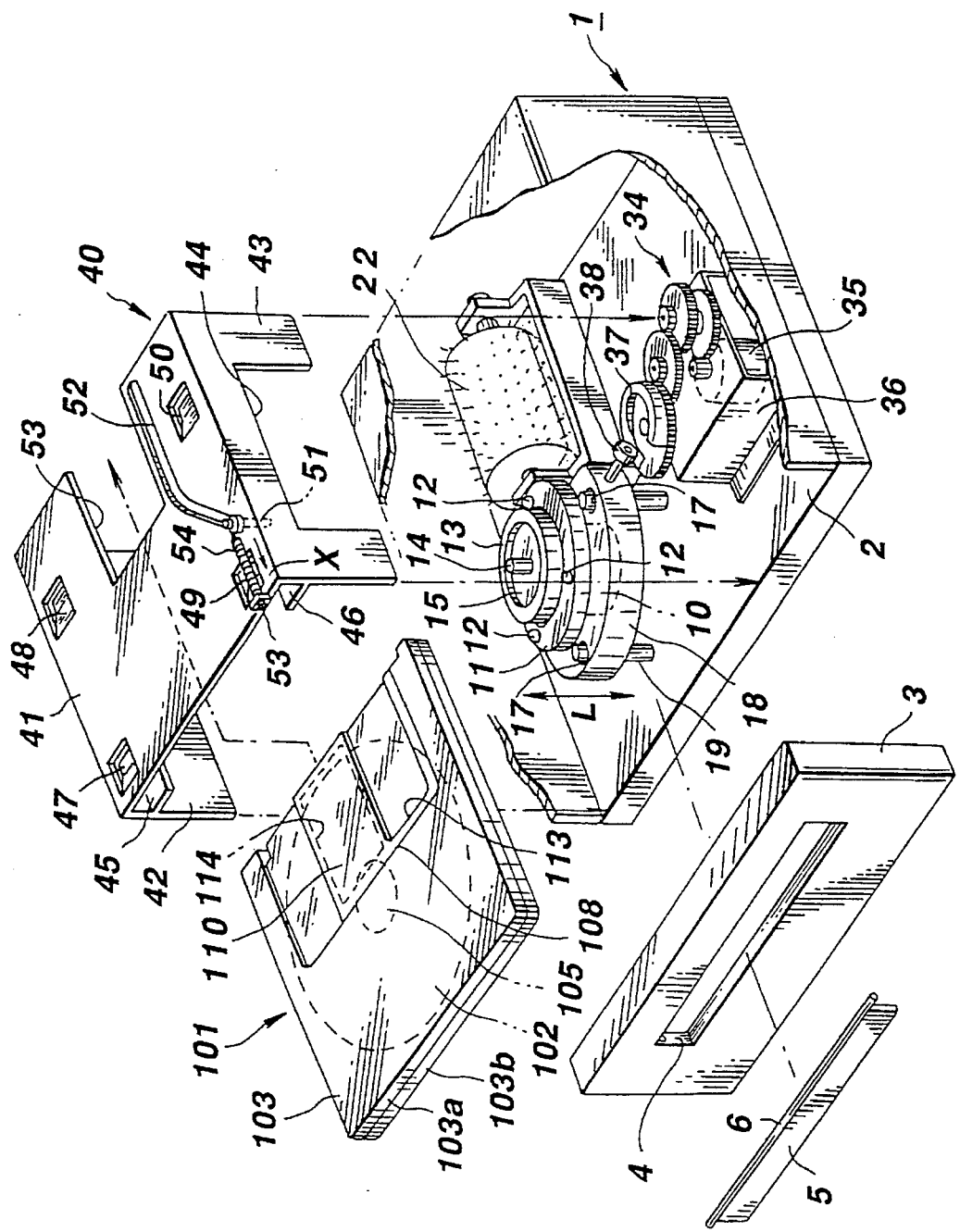
FIG. 3 is an exploded perspective view showing essential parts of the cleaning device shown in FIG. 1.

The disc cleaning device according to the present invention is constituted by an outer casing 1 having its bottom as a chassis 2, as shown in FIG. 3. The outer casing 1 has its open forward side closed by a front panel 3. A slit-shaped disc cartridge inserting opening 4, by which the disc cartridge 101 may be introduced, is formed in the front panel 3 and is adapted for being opened or closed by a lid 5. The lid 5 is formed as an elongated rectangular bar corresponding in size and shape to the cartridge inserting opening 4, and has a longitudinally extending rotary shaft 6 both sides of which are carried for rotation within the cartridge inserting opening 4. The lid 5 is rotated about the rotary shaft 6 as a center of rotation for opening or closing the cartridge inserting opening 4.

A spindle motor 10, constituting the rotating and driving unit for rotationally driving the magneto-optical disc 102 of the disc cartridge 101, is mounted on the chassis 2 provided by the bottom surface of the outer casing 1. The spindle motor 10 is mounted on a lifting block 18. This lifting block 18 has plural shaft-inserting through-holes 17 provided with slide bearings, not shown. The lift block is carried in a direction towards and away from the chassis 2 along motor guide shafts 19, which are mounted on the chassis 2 and passed through these through-holes 17, as indicated by arrow L in FIG. 3. That is, the spindle motor 10 is movable in a direction towards and away from the chassis 2. The spindle motor 10 has its spindle shaft 14 integral with its driving shaft 10a substantially perpendicular to the chassis 2. The spindle shaft 14 has its distal end directed upwards with respect to the chassis 2.

The disc table 13 is mounted on the driving shaft 10a of the spindle motor 10 for surrounding the distal end of the spindle shaft 14. The disc table 13 is in the form of a disk having a diameter substantially equal to that of the disc hub 105 so that the disc hub 105 attached to the magneto-optical disc 102 may be set thereon. A toroidal-shaped magnet 15 is mounted on the surface of the disc table 13 on which the disc hub 105 of the magneto-optical disc 102 is set for magnetically attracting the disc hub 105 of the magneto-optical disc 102 set on the disc table 13.

On the forward upper surface of the lifting block 18 is mounted a substantially toroidal-shaped cartridge positioning member 11 for surrounding the disc table 13. The cartridge positioning member 11 has at least three abutting projections 12 on its upper surface. The plane defined by the distal ends of these abutting projections 12 is located below the setting plane of the disc hub 105 on the disc table 13 and is extended parallel to the surface of the disc table 13 on which the disc hub 105 is set.

Figure 4:
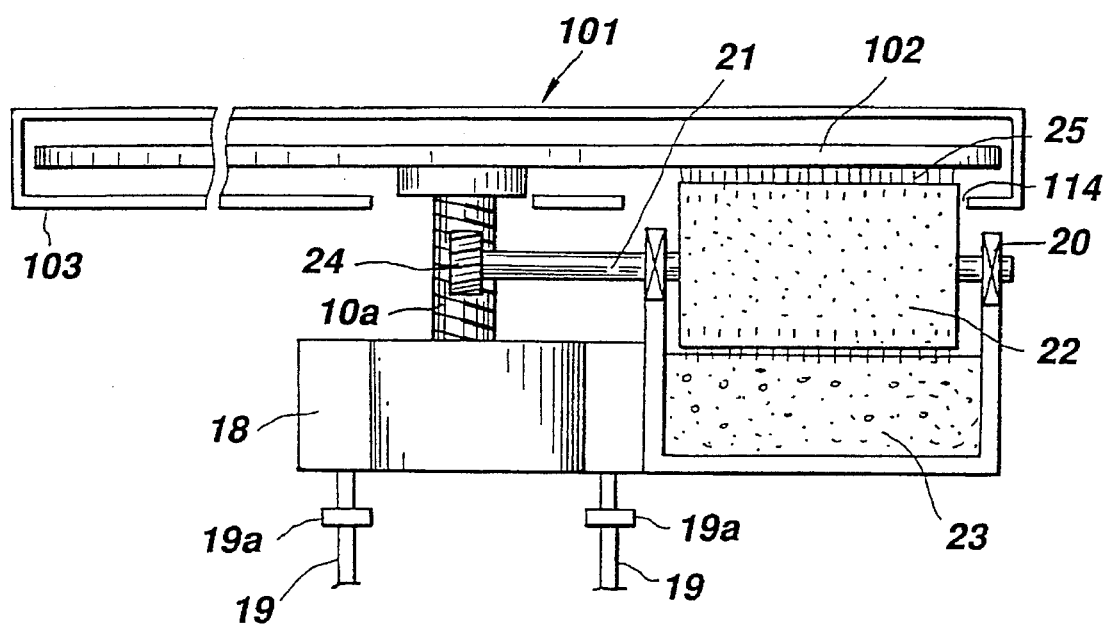
FIG. 4 is an enlarged side view showing the disc cartridge loaded in the disc cleaning device.

On the side upper surface of the lifting block 18 are mounted a cleaning roll 22 having a rotary shaft 21 rotatably carried by a bearing 20, and a felt pad 23 impregnated with a cleaning agent and adapted for being contacted with the outer periphery of the cleaning roll 22, as shown in FIGS. 3 and 4. Rotation of the driving shaft 10a of the spindle motor 10 is transmitted to a rotary shaft 21 of the cleaning roll 22 via a worm gear 24. The cleaning roll 22 has its outer periphery covered with a cleaning member 25 formed of e.g. a soft fluffy cloth. The cleaning roll 22 is adapted for being rotated with its outer periphery in sliding contact with the cleaning member 23.

A lifting motor 35 for lifting the lifting block 18 along with the disc table 13 with respect to the chassis 2 is provided on the chassis 2 laterally of the spindle motor 10. The lifting motor 35 is carried by a gear box 36 mounted on the chassis 2. A speed-reducing gear train 34, comprising plural spur gears meshing with a driving gear mounted on a driving shaft of the lifting motor 35 is provided within the gear box 36. The speed-reducing gear train 34 is adapted for transmitting the drive force of the lift motor 35 with speed reduction for rotating a cam gear 37 rotatably supported by the gear box 36. A cam roll 38 mounted on the distal end of an arm 39 attached to the lifting block 18 is caused to bear on the cam section of the cam gear 37. By rotation of the cam gear 37, the lifting block 18 is lifted via the cam section and the lift 39. The cam section of the cam gear 37 is a so-called end cam formed around the major surface of the cam gear 37. On the distal end of the arm 39 set on and engaged with the cam section is mounted a toroidal-shaped rotary member 38, via a rotary bearing, for reducing the friction between the arm 39 and the cam section 37.

A cartridge holder 40 is provided within the outer casing 1. The cartridge holder 40 is made up of a top plate section 41 and a pair of sidewall sections 42, 43 depending from both sides of the top plate section 41, and is formed such as by bending a metal sheet. The cartridge holder 40 is mounted on the chassis 2 by having the lower ends of the sidewall sections 42, 43 supported by the upper plate section of the chassis 2. Meanwhile, one of the sidewall sections 42, 43 has a notch 44 for preventing the gear box 36 from being caused to bear on the sidewall section.

The forward and rear portions of the cartridge holder 40 are opened to permit insertion of the disc cartridge 101 into the cartridge holder 40 in parallel with the chassis 2. Cartridge guides 45, 46 are provided facing each other in opposite inner lateral sides of the side wall sections 42, 43. These cartridge guides 45, 46 are provided parallel to the top plate section 41 so that, the distance between the top plate section 41 and the guides is slightly broader than the thickness of the cartridge main body 103. Four cartridge thrusting springs 47, 48, 49 and 50 are provided on the top plate section 41 at the four corners of the cartridge main body 103 of the disc cartridge 101 introduced into a space below the top plate section 41. These cartridge thrusting springs 47 to 50 are formed by segmenting part of the top plate section 41 and bending the segmented portions towards the inside of the cartridge holder 40. These cartridge thrusting springs 47 to 50 are adapted for thrusting the disc cartridge 101 inserted between the top plate section 41 and the cartridge guides 45, 46 towards the cartridge guides 45, 46.

Figure 5:
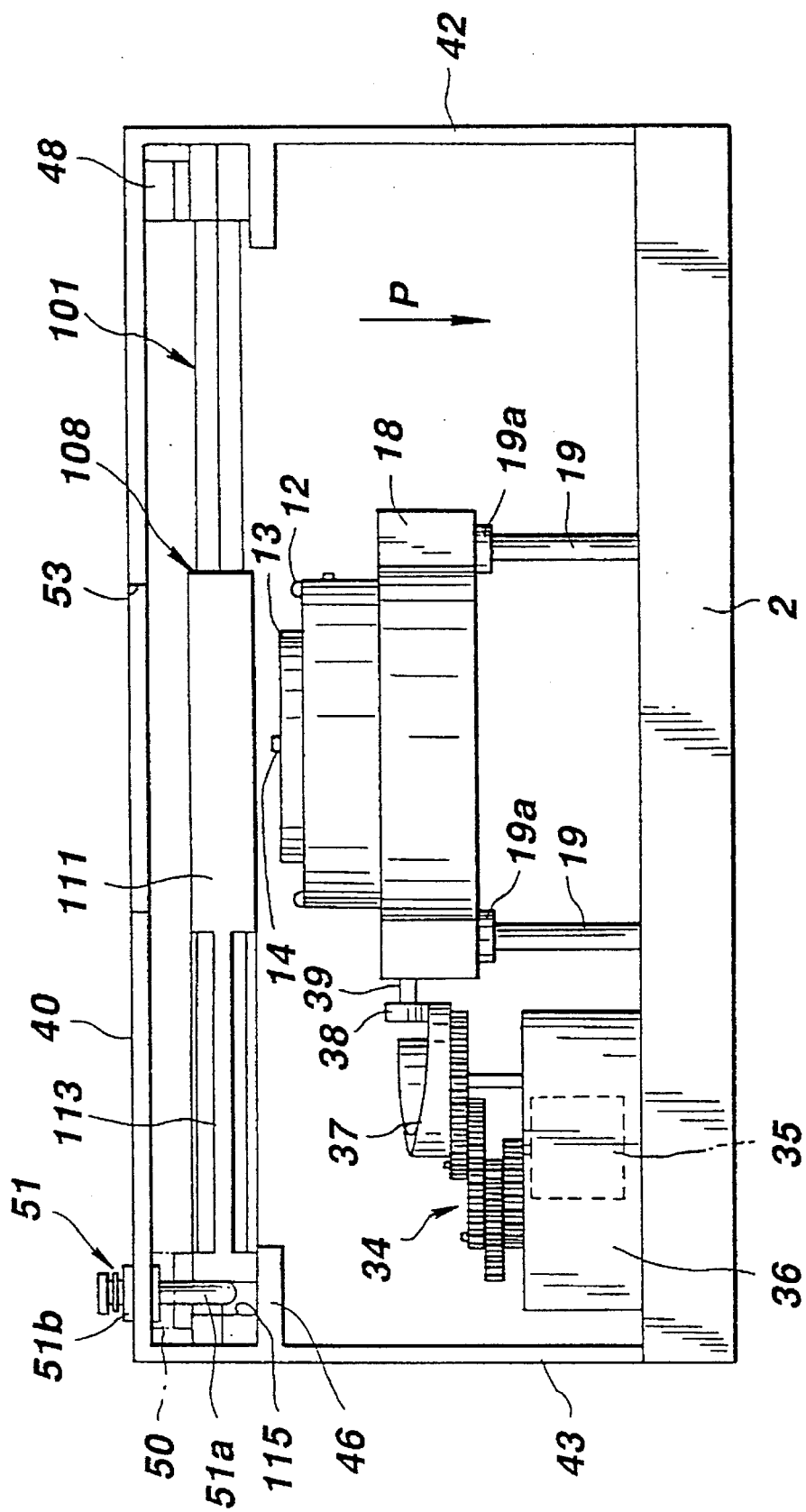
FIG. 5 is an enlarged back-side view showing the state in which the disc cartridge starts to be introduced into the disc cleaning device.
Figure 6:
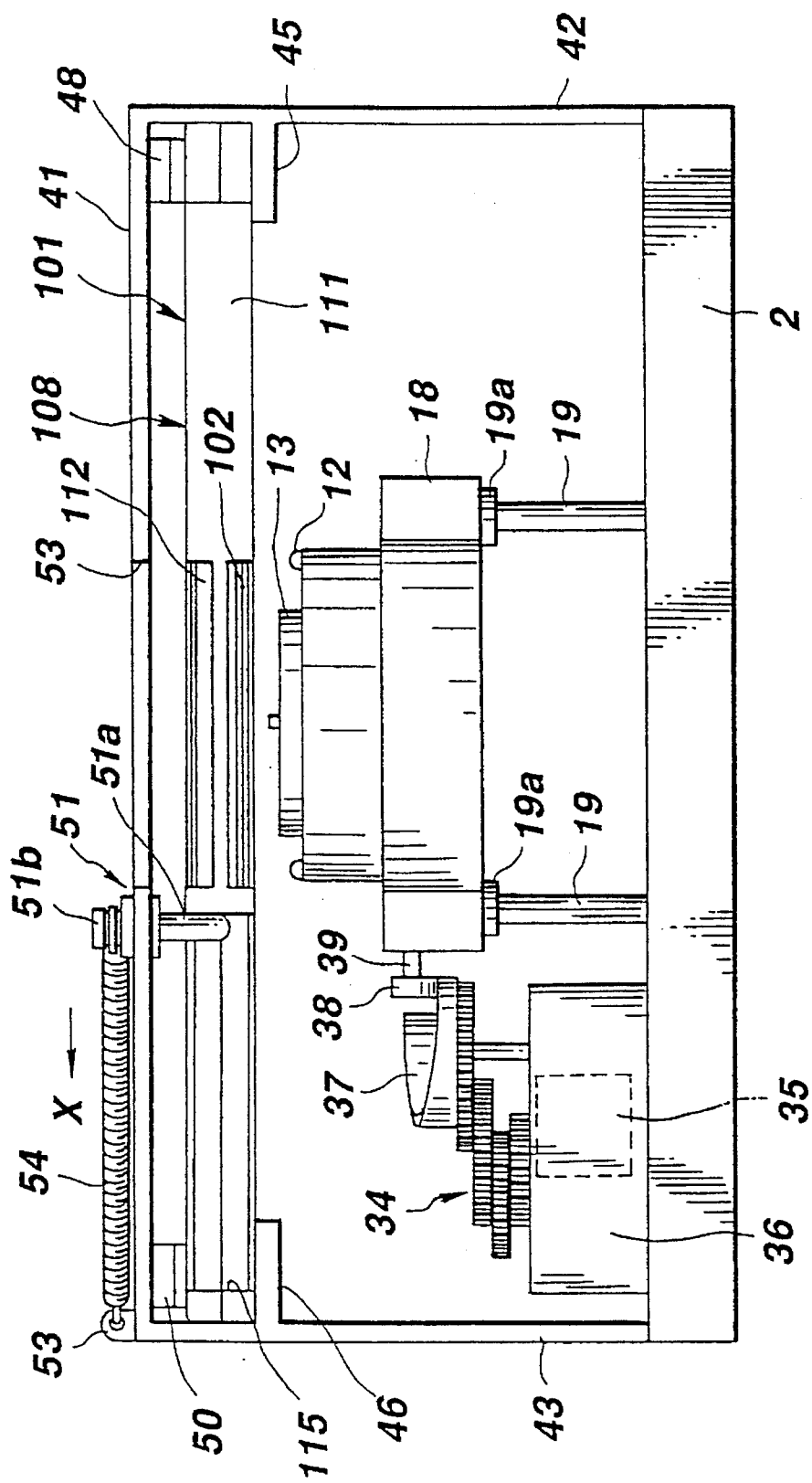
FIG. 6 is an enlarged back-side view showing the state in which the disc cartridge has been introduced into the disc cleaning device.

The top plate section 41 is provided with a shutter opening pin 51 for opening the shutter member 108 of the disc cartridge 101. The shutter opening pin 51 is inserted through a guide slit 52 formed in the top plate section 41 so as to be moved along the guide slit. The guide slit 52 has its forward end in proximity to the sidewall section 43 and is curved with respect to the sidewall section 43 so that its rear side progressively approaches to the center of the top plate section 41. The shutter opening pin 51 has its upper end 51b projected above the top plate 41 and its lower part 51a projected below the top plate 41, that is towards the inside of the cartridge holder 40, as shown in FIGS. 5 and 6. A torsion coil spring 54 is mounted between the upper end 51b of the shutter opening pin 51 and a spring retainer 53 provided at the forward end of the top plate 41. That is, the shutter opening pin 51 is biased by the tension coil spring 54 towards the forward side of the top plate 41, as indicated by arrow X in FIG. 3, into abutting contact with the forward end of the guide slit 52, so as to be positioned at an initial position.

For loading the disc cartridge 101 on the disc cleaning device, the disc cartridge 101 is introduced from the front side into a space between the top plate 41 and the cartridge guides 45, 46. As shown in FIG. 3, the disc cartridge 101 is inserted with the lateral side fitted with the shutter member 108 as an leading end.

This causes the lower end 51a of the shutter opening pin 51 to be abutted on the vicinity of one end of the web 111 of the shutter member 108 along an end side of the cartridge main body 103, as shown in FIG. 5. A mating recess 115 engaged by the lower end 51a of the shutter opening pin 51 is formed in the vicinity of the end of the web 111.

When the disc cartridge 101 is further introduced inwards into a space between the top plate 41 and the cartridge guides 45, 46, the Shutter opening pin 51 is thrust by the cartridge main body 103 so as to be moved rearwards, as shown in FIG. 6. At this time, while the shutter opening pin 51 is moved along the guide slit 52, it thrusts the web 111 of the shutter member 108 by its lower end 51a for opening the recording/reproducing apertures 114 by the shutter member 108. When the recording/reproducing apertures 114 are opened by the Shutter member 108, the window openings 112, 113 of the shutter member 108 are located at a mid position along the transverse direction of the cartridge main body 103. In this manner, the disc 102 is partially exposed to outside via the window openings 112, 113 across the inner and outer peripheries of the disc.

The disc cartridge 101 is further introduced into the inside of the cartridge holder 108, while it is thrust by the cartridge thrusting springs 47 to 50 towards the cartridge guides 45, 46, as shown by arrow P in FIG. 5. At this time, the lifting block 18 is positioned at its initial position by having its lower surface abutted on positioning projection 19a provided at the upper end of the motor guide shafts 19.

Figure 7:
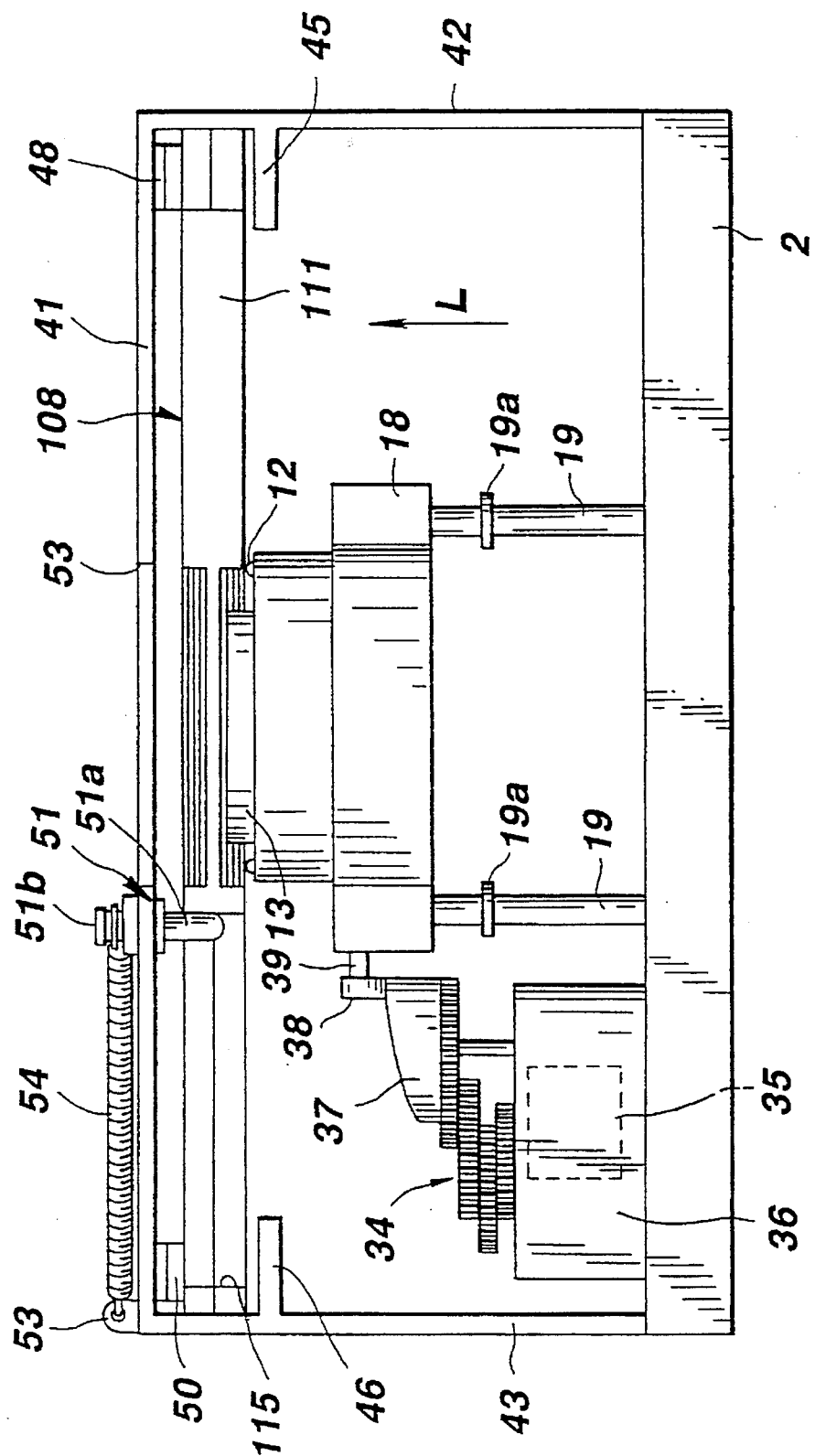
FIG. 7 i s an enlarged back-side view showing the state in which the holding operation for the disc cartridge introduced into the cleaning device has been terminated.

When the disc cartridge 101 has been inserted into the insert end position within the cartridge holder 108, the disc table 13 and the disc hub 105 face each other in a substantially coaxial position. A detector, not shown, detects that the disc cartridge 101 has been introduced to its insert end position and transmits a corresponding detection signal to a controller, not shown. The controller drives the lifting motor 35. By the driving of the lifting motor 35, cam gear 37 is driven rotationally via speed-reducing gear 34 for lifting the lifting block 18 upwards away from chassis 2, as shown by arrow L in FIG. 7. When the lifting block 18 is lifted to a preset loading position, the disc hub 105 of the magneto-optical disc 102 is set on the disc table 13, while the cartridge main body 103 is set on the cartridge positioning member 11, as shown in FIG. 7. At this time, the distal end of the spindle shaft 14 is inserted into the center hole 106, while the cartridge main body 103 has its recess 107 engaged by each projection 12 of the cartridge positioning member 11.

The cartridge main body 103, thus set on the cartridge positioning member 11, is spaced apart from the cartridge guides 45, 46 against the bias of the cartridge thrusting springs 47 to 50. With the disc hub 105 set on the disc table 13, the magneto-optical disc 102 is spaced apart from the inner wall surface of the cartridge main body 103. Since the distance between the upper surface of the disc table 13 and each projection 12 of the cartridge positioning member 11 is always constant, the magneto-optical disc 102 is maintained at a corresponding constant position with respect to the cartridge main body 103 within the cartridge main body 103. On the other hand, the disc hub 105 is held by the disc table under a force of suction produced by magnet 15.

Under this condition, the outer peripheral surface of the cleaning roll 22 is caused to bear on the information recording surface of the magneto-optical disc 102 within the cartridge main body 103 via the recording/reproducing apertures 114 of the disc cartridge 101, as shown in FIG. 4.

The spindle motor 10 is driven under this condition for rotationally driving the magneto-optical disc 102 and the cleaning roll 22.

The cleaning roll 22 is rotated with its outer peripheral surface in sliding contact with the information recording surface of the magneto-optical disc 102 for cleaning the information recording surface. Meanwhile, dust and dirt affixed to the outer peripheral surface of the cleaning roll 22 is removed by the cleaning member 23.

What is claimed is:

1. A disc cleaning device for cleaning a disc housed within a disc cartridge, the disc cleaning device comprising:

a chassis;

a cartridge holder connected to the chassis that holds the disc cartridge when the disc cartridge is loaded into the disc cleaning device, the cartridge holder having a top surface with a channel formed therein, the channel having a first end and a second end;

a single shutter opening pin positioned within the channel and supported by the cartridge holder for movement along the channel between the first end and the second end, the shutter opening pin opening an aperture in the disc cartridge when the disc cartridge is loaded into the cartridge holder, and closing the aperture when the disc cartridge is removed from the cartridge holder;

biasing means for biasing the shutter opening pin against the first end of the channel;

rotating and driving means connected to the chassis for rotating the disc housed within the disc cartridge;

a shaft support member connected to the chassis;

a cleaning material attached to the shaft support member; and a cleaning roll having a rotary shaft and an exterior cleaning surface, the rotary shaft being supported by the shaft support member and connected to the rotating and driving means to rotate the cleaning roll, the exterior cleaning surface being adapted to rotatably contact both the cleaning material and an information recording surface of the disc via the aperture in the disc cartridge when disc cartridge is loaded into the cartridge holder.

2. A disc cleaning device for cleaning a disc housed within a disc cartridge, the disc cleaning device comprising:

a chassis;

a cartridge holder connected to the chassis that holds the disc cartridge when the disc cartridge is loaded into the disc cleaning device, the cartridge holder having a top surface with a channel formed therein, the channel being curved and having a first end and a second end;

a single shutter opening pin positioned within the channel and supported by the cartridge holder for movement along the channel between the first end and the second end so that as the disc cartridge is inserted into the cartridge holder, the disc cartridge forces the shutter opening pin to contact a shutter member mounted on the disc cartridge and to follow the curvature of the channel towards the second end of the channel, thereby causing the shutter opening pin to move at a right angle with respect to the direction of insertion and to open an aperture in the disc cartridge, and so that as the disc cartridge is removed from the cartridge holder, the shutter opening pin allows the aperture to be closed;

biasing means for biasing the shutter opening pin against the first end of the channel;

rotating and driving means connected to the chassis for rotating the disc housed within the disc cartridge;

a shaft support member connected to the chassis;

a cleaning material attached to the shaft support member; and a cleaning roll having a rotary shaft and an exterior cleaning surface, the rotary shaft being supported by the shaft support member and connected to the rotating and driving means to rotate the cleaning roll, the exterior cleaning surface being adapted to rotatably contact both the cleaning material and an information recording surface of the disc via the aperture in the disc cartridge when the disc cartridge is loaded into the cartridge holder.

* * * * *